United States Patent
Ricketts

(10) Patent No.: US 10,172,291 B2
(45) Date of Patent: Jan. 8, 2019

(54) COMBINE THRESHING SYSTEM WITH CROP FLOW CONTROL

(71) Applicant: CNH Industrial America LLC, New Holland, PA (US)

(72) Inventor: Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/407,017

(22) Filed: Jan. 16, 2017

(65) Prior Publication Data

US 2018/0199514 A1   Jul. 19, 2018

(51) Int. Cl.
| | |
|---|---|
| A01F 12/28 | (2006.01) |
| A01F 7/06 | (2006.01) |
| A01F 12/18 | (2006.01) |
| A01F 12/22 | (2006.01) |
| A01F 12/46 | (2006.01) |

(52) U.S. Cl.
CPC .............. *A01F 7/067* (2013.01); *A01F 7/065* (2013.01); *A01F 12/181* (2013.01); *A01F 12/22* (2013.01); *A01F 12/28* (2013.01); *A01F 12/46* (2013.01)

(58) Field of Classification Search
CPC .... A01D 41/00; A01D 41/1276; A01D 41/12; A01D 69/00; A01F 12/18; A01F 12/28; A01F 12/40; A01F 12/26; A01F 12/22; A01F 12/442; A01F 7/06; A01F 7/067; A01F 7/062; A01F 7/065; A01F 12/181; A01F 12/46

USPC ..... 56/14.6, 153; 460/62, 169, 109, 112, 73, 460/80, 66

See application file for complete search history.

(56) References Cited

U.S. PATENT DOCUMENTS

| | | | |
|---|---|---|---|
| 4,222,395 A | 9/1980 | Johnston | |
| 4,330,000 A * | 5/1982 | Peiler | A01F 12/28 460/109 |
| 4,461,306 A | 7/1984 | De Busscher | |
| 6,152,820 A * | 11/2000 | Heidjann | A01F 12/40 460/112 |
| 7,393,274 B2 * | 7/2008 | Voss | A01F 12/28 460/109 |

(Continued)

FOREIGN PATENT DOCUMENTS

| | | |
|---|---|---|
| GB | 2057838 | 4/1981 |
| WO | 2014117450 | 8/2014 |

*Primary Examiner* — Robert E Pezzuto
(74) *Attorney, Agent, or Firm* — Peter K. Zacharias; Patrick M. Sheldrake

(57) ABSTRACT

A threshing system for an agricultural harvester includes a rotor and a substantially cylindrical cage that surrounds at least a portion of the rotor. The threshing system also features a material flow adjustor for controlling axial movement of material through the cage. The material flow adjustor is movably mounted adjacent to a threshing space and includes at least one material conveying edge that enters the threshing space. The material flow adjustor is moveable between a first operative position, in which the at least one material conveying edge is spaced from the rotor in a radial direction by a first distance, and a second operative position in which the at least one material conveying edge is spaced from the rotor in the radial direction by a second distance, the second distance being less than the first distance.

25 Claims, 4 Drawing Sheets

(56) References Cited

U.S. PATENT DOCUMENTS

| | | |
|---|---|---|
| 7,682,236 B2 | 3/2010 | Buermann |
| 8,075,377 B2* | 12/2011 | Pope ................... A01F 7/067 460/66 |
| 8,636,568 B1 | 1/2014 | Farley |
| 8,636,569 B1 | 1/2014 | Flickinger |
| 8,926,415 B2 | 1/2015 | Farley |
| 9,220,200 B2* | 12/2015 | Bergkamp ............. A01F 12/28 |
| 9,295,197 B1 | 3/2016 | Veikle |
| 9,301,450 B2 | 4/2016 | Boyd |
| 9,456,549 B2 | 10/2016 | Missotten |
| 2004/0226275 A1* | 11/2004 | Baumgarten ...... A01D 41/1276 56/153 |
| 2011/0320087 A1* | 12/2011 | Farley ................. A01F 7/067 701/34.2 |

* cited by examiner

COMBINE THRESHING SYSTEM WITH CROP FLOW CONTROL

FIELD OF THE INVENTION

The present invention pertains to an agricultural combine or harvester and, more specifically, to a threshing system with a material flow adjustor for controlling and adjusting the flow of crop material through the threshing system.

BACKGROUND OF THE INVENTION

Many agricultural combines or harvesters utilize a rotary threshing and separating system to loosen and separate crop material (e.g. grain, straw, legumes, and the like) from crop residue and waste (e.g. husks, cobs, pods, and the like). The threshing system typically includes a rotor drivingly rotated inside a threshing chamber. The rotor often includes a frusto-conical inlet end with a helical flight or flights for conveying crop material into the threshing chamber. In addition, the rotor typically includes a plurality of elements that project outwardly from the main body of the rotor. These projections can include rasp bars or other protrusions designed to convey a mat of crop material along a helical path through the threshing chamber as the rotor rotates. The rasp bars can engage inner surfaces of the threshing chamber to separate crop residue from crop material. Some examples of rotors used in threshing and separating systems are described in U.S. Pat. No. 8,636,568 and U.S. Pat. No. 8,636,569, both assigned to the applicant, the contents of both being incorporated by reference herein in their entireties.

Many threshing chambers include one or more transport vanes that assist in guiding the crop material and residue from the inlet or "front" of the threshing chamber to the opposite end or "rear" of the threshing chamber. The positioning and orientation of vanes can be adjusted, depending on the crop and other variables, to control the rate of flow of material through the threshing chamber, and consequently, the dwelling time of crop material in the threshing system. For example, vanes can be adjusted to increase the rate at which crop material moves rearward per each revolution of the rotor. Some examples of crop transport vanes are described in U.S. Pat. No. 8,926,415, assigned to the applicant, the content of which is incorporated by reference herein in its entirety.

Although vanes assist in guiding crop material toward the rear of the threshing chamber, vanes also create resistance forces that make it more difficult to advance crop material through the chamber. As crop material accumulates in the threshing space, and rubs against the vanes, more horsepower is required to move the crop material through the chamber. This reduces the efficiency of the threshing process, due to a higher fuel consumption and increased energy cost.

Transport vanes can also be problematic when the flow rate of crop material through the cage needs adjustment. Some transport vanes are limited in how precisely they can control crop flow rate. For example, some vanes can only be positioned in one of three settings, corresponding to a "fast" speed, "medium" speed and "slow" speed. This can be undesirable for crop conditions that require finer adjustments or a variety of different speeds.

Based on the foregoing reasons, there is a need for improved threshing and separating systems that address multiple objectives, including but not limited to increased energy efficiency and better control over crop flow through the threshing and separating system.

SUMMARY OF THE INVENTION

The drawbacks of conventional threshing and separating systems are addressed in many aspects by threshing and separating systems in accordance with the invention.

According to one embodiment of the invention, a threshing system for an agricultural harvester, includes a rotor comprising an elongated body. The elongated body can have a first end adapted to receive material from a feeding mechanism and a second end opposite the first end. The threshing system can also have a substantially cylindrical cage that surrounds at least a portion of the rotor. The cage can include an inner surface spaced radially apart from the rotor to define a threshing space between the rotor and the cage. The threshing system can further include a material flow adjustor for controlling axial movement of material through the cage. The material flow adjustor can be movably mounted adjacent to the threshing space and feature at least one material conveying edge adapted to enter the threshing space. The rotor can be configured to rotate relative to the cage about a first axis of rotation to axially convey material from the first end of the rotor toward the second end of the rotor. The material flow adjustor can be moveable between a first operative position, in which the at least one material conveying edge is spaced from the rotor in a radial direction by a first distance, and a second operative position in which the at least one material conveying edge is spaced from the rotor in the radial direction by a second distance, the second distance being less than the first distance.

In another embodiment, the material flow adjustor can be configured to rotate about a second axis of rotation. The second axis of rotation can extend parallel to and be radially offset from the first axis of rotation of the rotor.

In another embodiment, the material flow adjustor can include an elongated body that extends generally parallel to the first axis of rotation. The at least one material conveying edge can project radially outwardly from the elongated body.

In another embodiment, the at least one material conveying edge can include a projection extending helically around the elongated body of the material flow adjustor.

In another embodiment, the material flow adjustor can include an auger having a shaft. The at least one material conveying edge can be a thread that extends helically around the shaft.

In another embodiment, the material flow adjustor can be operable in a first mode to increase axial flow of material in the cage toward the second end of the rotor.

In another embodiment, the material flow adjustor can be operable in a second mode to decrease axial flow of material in the cage toward the second end of the rotor.

In another embodiment, the material flow adjustor can rotate in a first direction of rotation in a first mode, and can rotate in a second direction of rotation in a second mode, the second direction of rotation being opposite the first direction of rotation.

In another embodiment, the material flow adjustor can rotate between about 0.1 rpm to about 35.0 rpm in a first mode.

In another embodiment, the material flow adjustor can be movably mounted to the cage.

In another embodiment, a housing is attached to a cage. The housing can extend longitudinally along at least a portion of the cage. The material flow adjustor can be movably mounted in an interior space of the housing, and can be advanced from the interior space into the threshing space through an opening in the cage.

In another embodiment, when the material flow adjustor is in a first operative position, the material flow adjustor is contained entirely within the interior space of the housing and outside of the threshing space.

In another embodiment, when the material flow adjustor is in a second operative position, at least a portion of the material flow adjustor extends into the threshing space.

In another embodiment, the cage can include a first wall section that defines an inner surface and directly borders the threshing space.

In another embodiment, the cage can include a second wall section that is offset radially outwardly relative to a first wall section to define an outer recess in the cage.

In another embodiment, the cage can include a material flow adjustor movably mounted in an outer recess of the cage.

In another embodiment, the material flow adjustor can be movable in a circumferential direction relative to the cage between a first operative position and a second operative position.

In another embodiment, a second wall section of the cage can include a first end section and a second end section opposite the first end section, the first end section being spaced a third distance from the rotor, and the second end section being spaced a fourth distance from the rotor that is less than the third distance, such that the second wall section extends in an inward direction toward the rotor as the second wall section extends from the first end section toward the second end section.

In another embodiment, the second wall section of the cage defines a guide surface in the outer recess that urges the material flow adjustor toward the rotor as the material flow adjustor is moved from the first operative position to the second operative position.

In another embodiment, the threshing system includes one or more actuators for moving the material flow adjustor between a first operative position to a second operative position.

In another embodiment, the actuator includes an electric actuator, a hydraulic actuator or a manual lever.

In another embodiment, the inner surface of the cage includes one or more vanes for axially guiding material through the threshing space toward the second end of the rotor.

In another embodiment, when the material flow adjustor is moved to a first operative position, the at least one material conveying edge is positioned radially inwardly from the inner surface of the cage by a distance of about 0.1 mm to about 35.0 mm.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

Various terms are used throughout the disclosure to describe the physical shape or arrangement of features. A number of these terms are used to describe features on rotors and cages that either have, or conform to, a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to the center axis of the cylinder. For example, the length of a cylinder is considered a "longitudinal" dimension. The terms "radial" and "radially" refer to a direction, dimension or orientation that is perpendicular to the center axis of the cylinder. For example, the radius and diameter of a cylinder are considered "radial" dimensions. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

Figure 1:
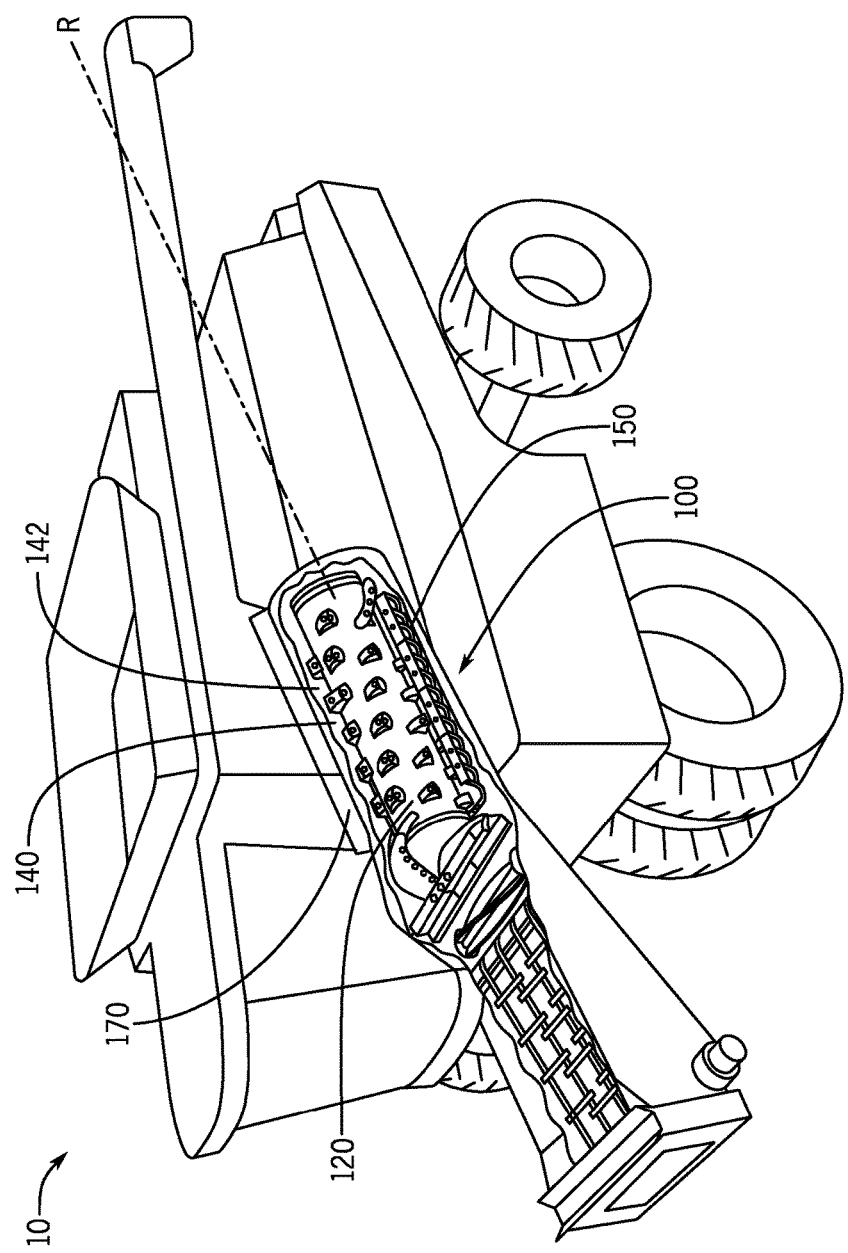
FIG. 1 illustrates a perspective view of an exemplary embodiment of an agricultural combine, the combine comprising a threshing system with a material flow adjustor in accordance with an exemplary embodiment of the present invention.

FIG. 1 shows an exemplary agricultural combine 10 in accordance with one embodiment of the invention. Combine 10 includes a longitudinally arranged threshing and separation system 100 (referred to herein as the "threshing system" for brevity). Threshing system 100 includes a substantially cylindrical threshing rotor 120 that is supported and rotatable in a predetermined direction about a rotational axis R therethrough. Rotor 120 is rotatable on axis R to convey a flow of crop material in a helical flow path through a threshing chamber 140 that extends circumferentially around the rotor. Threshing chamber 140 is surrounded by a substantially cylindrical cage 150, a portion of which is omitted in FIG. 1 so that rotor 120 is visible in the Figure. Cage 150 can include grates, concaves or other cylindrical-shaped sections that extend circumferentially around rotor 120. Material entering threshing chamber 140 passes in a threshing space 142 between rotor 120 and cage 150. As crop material flows through threshing system 100, the crop material (e.g. grain, straw, legumes, and the like) is loosened and separated from crop residue and waste (e.g. husks, cobs, pods, and the like). Threshed crop material falls through openings in the bottom of cage 150 and gets transported to a different area of the combine for further processing.

Threshing system 100 also includes a material flow adjustor 170 for controlling axial movement of material through cage 150. Material flow adjustor 170 is operable to increase or decrease the flow of crop material through threshing chamber 140, depending on need, to provide the proper dwelling time in the threshing chamber. As will be explained, material flow adjustor 170 provides infinite adjustment to the flow of crop material through threshing chamber 140, and is not limited to fixed incremental settings. As such, material flow adjustor 170 can be utilized to make very fine adjustments to the flow of crop material.

Unlike vanes and other mechanisms for aiding material transport, material flow adjustors in accordance with the invention do not reside entirely inside threshing chambers, or occupy a significant amount of space in threshing chambers. Instead, material flow adjustors in accordance with the invention are mounted to the circumference of the threshing chamber in a tangential manner, extending longitudinally along the length of the threshing chamber. In this arrangement, the only component of the material flow adjustor that enters the threshing chamber is a material conveying element that occupies one small area on the circumference of the chamber. The material conveying element projects into the chamber only as deep as is needed to penetrate into the crop mat and axial advance the crop mat. As such, the material conveying element only occupies a small longitudinal zone alongside the chamber, creating minimal obstruction inside the threshing space, and consequently, minimum impedance to crop flow.

Figure 2:
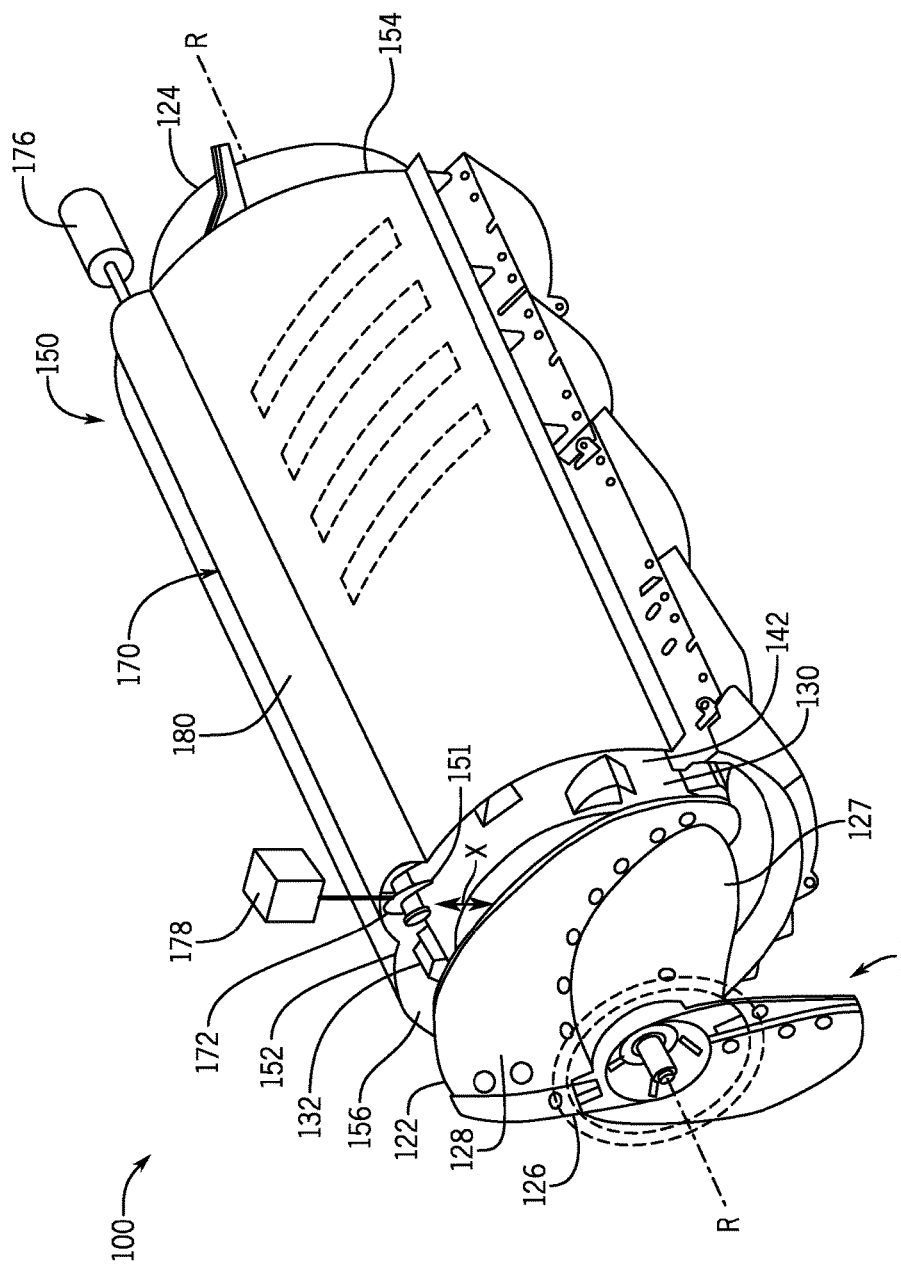
FIG. 2 illustrates the threshing system with material flow adjustor in FIG. 1, in accordance with an exemplary embodiment of the present invention.

Referring now to FIG. 2, threshing system 100 is shown in more detail. Rotor 120 includes a first end 122, shown on the left side of the Figure, and a second end 124 opposite the first end, shown on the right side of the Figure. First end 122 includes an infeed area 126 configured to receive and convey crop material into threshing chamber 140. Infeed area 126 features a cone shaped section 127 and auger plates 128 that extend helically around the cone shaped section. Rotor 120 also includes a main body or threshing section 130. Threshing section 130 includes a plurality of protrusions in the form of rasp bars 132 that project radially outwardly from the rotor. Rasp bars 132 are preferably arranged in a helical array around the circumference of threshing section 130. As rotor 120 rotates inside cage 150, rasp bars 132 engage the crop material to loosen and separate crop grain from the rest of the crop material.

Cage 150 includes a first end 152 located in proximity to the first end 122 of rotor 120. Cage also includes a second end 154 located in proximity to second end 124 of rotor 120. In addition, cage 150 defines a generally cylindrical inner surface 156 that extends between first end 152 and second end 154 of the cage. Threshing space 142 separates rotor 120 from inner surface 156 of cage 150.

Material flow adjustor 170 controls axial movement of material through cage 150. More specifically, material flow adjustor 170 influences the flow of material through threshing space 142 by applying a controlled component of force to a specific linear section of the crop mat. The component of force is directed in an axial or longitudinal direction. As such, the material flow adjustor 170 adds an axially directed component of force to the crop mat as the crop mat advances helically around rotor 120 from the first end of the rotor toward the second end of the rotor. The axially directed component for force adds additional force and momentum to the crop mat to overcome any resistance that might build up in threshing system 100, reducing the amount of energy required to move crop material through the threshing system at a desired speed.

As noted above, material flow adjustor 170 has a material conveying element that projects into threshing chamber 140. Material flow adjustors in accordance with the invention can utilize a variety of different material conveying elements to apply axial force to the crop material. Material conveying elements can include, for example, one or more material conveying edges that penetrate into the crop material and push the crop material in an axial direction. Material conveying edges in accordance with the invention can be in the form of one or more bars, blades, fins, spikes, barbs, teeth or other protuberances that extend into the threshing space and engage crop material.

Figure 3:
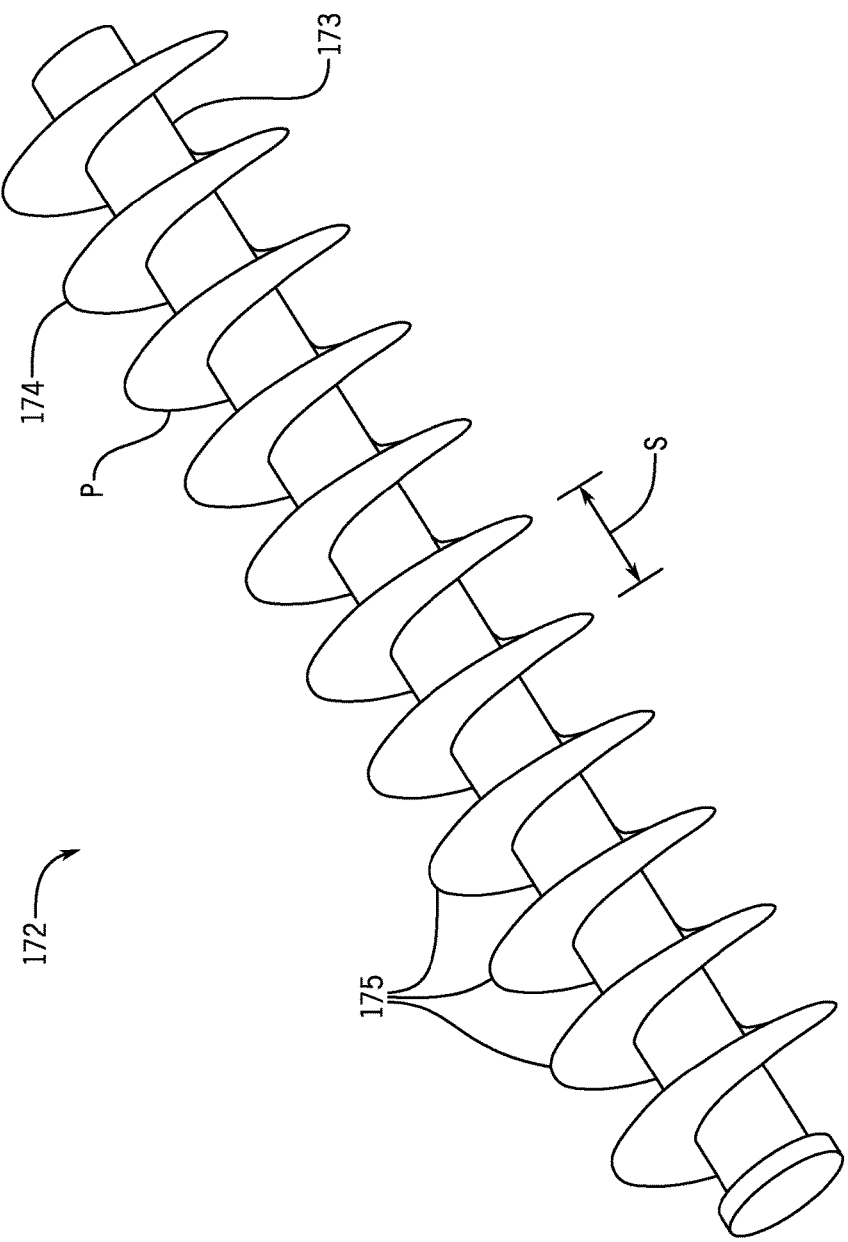
FIG. 3 illustrates a component of the material flow adjustor of FIG. 1, in accordance with an exemplary embodiment of the present invention.

Material conveying elements in accordance with the invention can be arranged in numerous ways on the perimeter of the threshing chamber. For example, material conveying elements in accordance with the invention can be mounted to the cage or other area in the combine that allows the material conveying element to enter the threshing space. In the present example, material flow adjustor 170 features a material conveying element in the form of an auger 172. Auger 172, which is shown in more detail in FIG. 3, features a shaft 173 and a single thread 174 that winds helically around the shaft. Thread 174 is a single unitary body having a defined thread pitch angle P. In addition, thread 174 is divided up into a series of twists or "turns" 175 that are juxtaposed along the length of shaft 173. Each turn 175 extends 360 degrees around shaft 173, and is spaced from an adjacent turn(s) by a thread spacing S.

Material flow adjustors featuring augers or other rotatable conveying elements in accordance with the invention can utilize various components to drive the conveying elements, and to adjust the depth of insertion of the conveying elements into the threshing chamber. In the present example, auger 172 is connected to a drive motor 176 operable to rotate or spin the auger. Drive motor 176 is configured to rotate auger at a selected speed (rpms). As will be explained, the speed is infinitely adjustable to apply a desired axial component of force to crop material. The drive motor can be mounted to the cage directly, or to a bulk head that is used to retain the rotor cage to the structure of the combine. The drive motor can drive the auger by the use of a chain drive. Alternatively, the male portion of a drive motor can be installed into a female end of the auger shaft. The control for the auger can be installed in the cab of the combine, with the type of control mechanism depending on the particular drive system (e.g. electric or hydraulic).

Threshing systems in accordance with the invention can also feature one or more actuators to adjust and control the position of the material flow adjustor relative to the rotor. Each actuator can be connected at a specific location along the length of the material flow adjustor, such as at an end of the material flow adjustor, or at a midsection of the material flow adjustor. In threshing system 100, for example, an actuator 178 is schematically shown connected to one end of auger 172 to adjust and control the position of the auger relative to threshing space 142. It will be understood that a second actuator that is similar or identical to actuator 178 can be attached to the opposite end of auger 172, or at a midsection of the auger.

Actuator 178 is operable to move auger 172 into threshing space 142 or out of the threshing space. When actuator 178 is operated, auger 172 is moved in a radial direction relative to rotor 120, as shown by double-ended arrow X. Auger 172 is movable into or out of threshing space 142 through an aperture or opening 151 in cage 150. Actuator 178 can move auger 172 through opening 151 in a radially inward direction and toward the rotor axis R, or move the auger in a radially outward direction and away from rotor axis R. For example, actuator 178 can move auger 142 between a first operative position, in which thread 174 is spaced from the rotor in a radial direction by a first distance, and a second operative position in which the thread is spaced from the rotor in the radial direction by a second distance, the second distance being less than the first distance. In this scenario, thread 174 is positioned closer to the rotor in the second operative position than in the first operative position. As such, the second operative position represents a condition in which the auger 172 penetrates deeper into the threshing space than the first operative position, engaging more crop material than in the first operative position. The depth to which auger 172 can be inserted into threshing space 142 can be infinitely adjustable within a range of depths. For example, the auger thread can be positioned radially inwardly from the inner surface of the cage by a distance of about 0.1 mm to about 35.0 mm. It will be understood that augers in accordance with the invention can also be inserted into the threshing space at shallower depths or deeper depths with satisfactory results.

One manner of operating threshing systems in accordance with the invention will now be described with reference to the elements of threshing system 100. It will be understood that the following description only provides one example of how the threshing system can be operated, and does not represent the only manner in which the system can be operated.

Prior to feeding crop material into threshing system 100, drive motor 176 is powered on to rotate auger 172 at a desired speed. For example, drive motor 176 can be set to rotate the auger 172 at a rate between about 0.1 rpm to about 50.0 rpm, depending on the type of crop, crop conditions, the radial distance of auger 172 relative to rotor 120, and the desired result. It will be understood that faster or slower speeds can also be used in accordance with the invention. Actuator 178 is engaged to lower auger 172, and more specifically, the thread 174, to a desired depth in threshing space 142, with "depth" measured in the radially inward direction from inner surface 156 of cage 150. For example, actuator can be engaged to lower thread 174 to a depth of about 0.1 mm to about 35.0 mm from inner surface 156 of cage 150. It will be understood that material conveying elements can be lowered to other depths inside threshing space in accordance with the invention, with satisfactory results.

After the auger speed and position are set, crop material is fed through the infeed area 126 and into threshing chamber 140. As crop material enters threshing space 142, portions of the crop material along the perimeter of cage 150 are drawn into material flow adjustor 170. More specifically, portions of crop material enter into the spaces between successive turns 175 of thread 174. As thread 174 rotates, the turns 175 operate similar to a worm gear that applies axial force on material trapped between the turns. This axial force assists in moving the crop material through cage 150, while introducing little or no resistance force, so that less energy is required to pass the crop material through the threshing system.

The rotational speed of auger 172 is infinitely adjustable to precisely control the amount of force applied to the crop material, and the resulting flow rate of material through the threshing system 100. If desired, auger 172 can be rotated in a first direction of rotation in a first mode, and rotated in a second direction of rotation in the second mode, where the second direction of rotation is opposite the first direction of rotation. As such, auger 172 can be operated to accelerate the axial flow of crop material, or disrupt the flow the crop material. Auger 172 can also be adjusted to various operative positions to provide a desired influence on crop flow. For example, the actuator can be set to a first operative position, in which the auger is contained entirely within the interior space of the housing and outside of the threshing space, exhibiting no influence on crop flow. As an alternative, the actuator can be set to a second operative position, where a portion of the auger extends into the threshing space. As another alternative, the actuator can be set to a third operative position, in which the entire auger extends into the threshing space. As the auger flight is advanced further and further into the threshing space, the auger has more contact with crop material and influences the flow of a greater amount of material. Altering the depth of the auger in the threshing space also exposes the auger to different layers within the crop mat, which can influence the physical separation of crop grain from the crop material.

Material flow adjustors can be arranged in a number of ways to help augment and assist the flow of crop material. In the example shown in FIG. 2, auger 172 is movably mounted in a housing 180 that is attached to an exterior section of cage 150. Housing 180 extends longitudinally along one side of cage 150 in a tangential manner, and is attached to the housing over opening 151.

Figure 4:
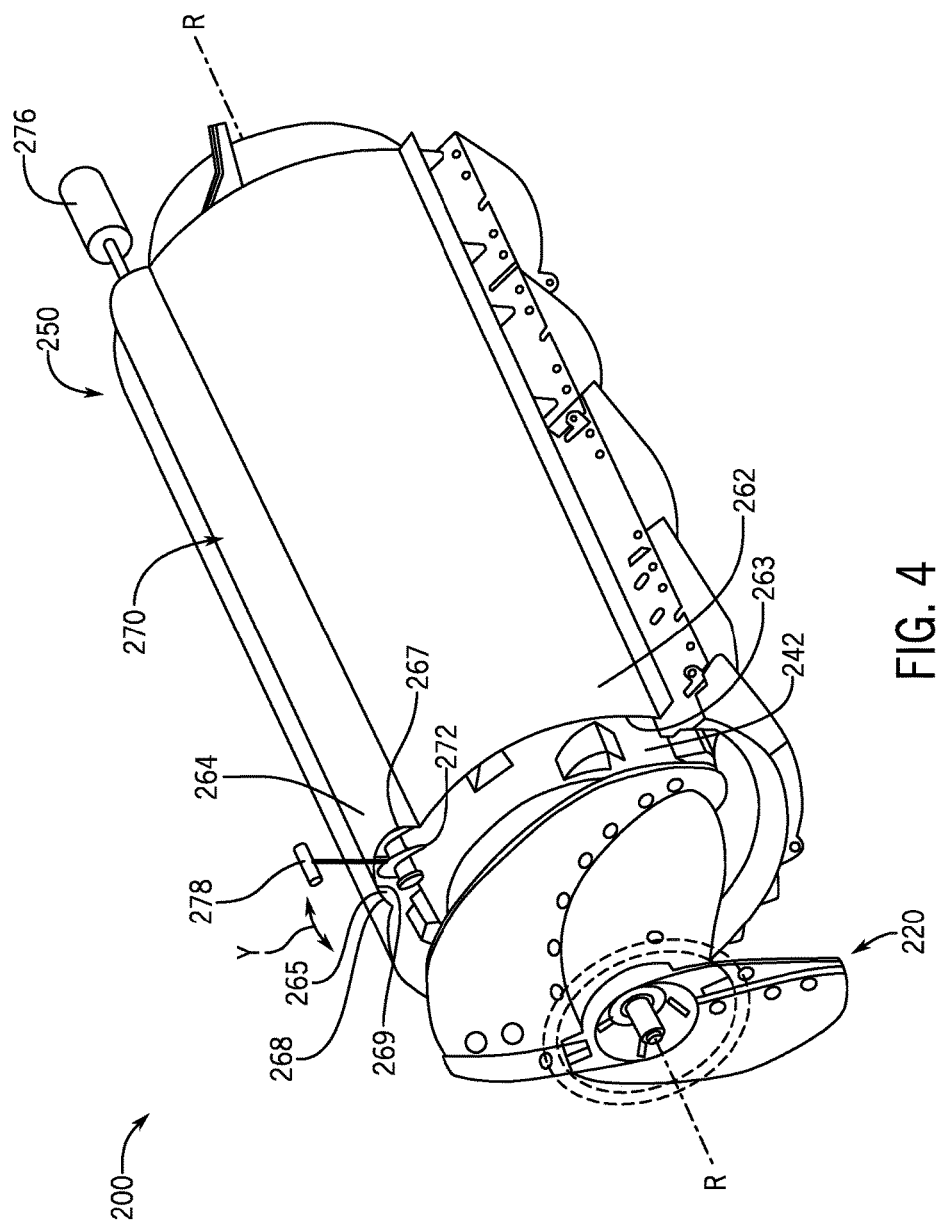
FIG. 4 illustrates a threshing system with material flow adjustor in accordance with an alternate exemplary embodiment of the present invention.

Referring now to FIG. 4, an alternative embodiment of a threshing system 200 is shown in accordance with the invention. Threshing system 200 is identical to threshing system 100, but includes a few differences in how the cage and material flow adjustor are configured, and how the material flow adjustor operates. Threshing system 200 includes a substantially cylindrical threshing rotor 220 that is supported and rotatable in a predetermined direction about a rotational axis R, inside a cage 250. Cage 250 is substantially cylindrical in shape, and includes a first wall section 262 that defines an inner surface 263 which directly borders a threshing space 242. Cage 250 also includes a second wall section or "offset" 264 that extends radially outwardly relative to first wall section 262, defining an outer recess 265 in the cage. A material flow adjustor 270 featuring an auger 272 is movably mounted in outer recess 265.

Auger 272 is movable in a circumferential direction relative to cage 250 between a first operative position and a second operative position. Second wall section 264 of cage 250 includes a first end section 267 and a second end section 268 opposite the first end section. First end section 267 is spaced at a distance from the rotor. Second end section 268 is also spaced at a distance from the rotor, but that distance is less than the distance between the rotor and the first end section. As such, second wall section 264 extends in a radially inward direction toward rotor 220 as the second wall section progresses from first end section 267 toward second end section 268. In this arrangement, second wall section 264 defines a guide surface 269 in outer recess 265.

Auger 272 is connected to a drive motor 276 operable to rotate or spin the auger. Auger 272 is also connected to an actuator 278 for moving auger 272 between the first operative position and the second operative position. When actuator 278 is operated, guide surface 269 acts as a ramp or cam that causes auger 272 to move in a radial direction relative to the rotor as the auger moves in the circumferential direction. The resulting path of movement is as shown by double-ended arrow Y. Actuator 278 can operate in different modes to control the position of material flow adjustor 270. For example, actuator 278 can operate in a first mode (or "fixed mode"), in which the actuator moves auger 274 to a fixed position or depth in threshing space 242, where the auger remains in a stationary position relative to rotor 220. In addition, or as alternative, actuator 278 can operate in a second mode (or "dynamic mode"), in which the actuator continuously moves auger 274 back and forth in an oscillating manner in recess 265. In this second mode, auger 274 cycles back and forth between a first operative position and a second operative position in threshing space to continuously penetrate the crop mat at different depths while it rotates on its own axis.

Actuators in accordance with the invention can utilize various mechanisms for controlling material flow adjustors, including but not limited to hydraulic cylinders, electric actuators, acme screws, manual levers, or other means. Material flow adjustors can be used to replace vanes in a threshing system, or be used in conjunction with vanes in a threshing system, to control the flow of crop material through the cage. Referring again to the example in FIG. 2, threshing system 100 includes a plurality of vanes 180 on the inner surface of cage 150 (shown in dashed lines) for axially guiding material through the threshing space and toward the second end of the rotor. It will be understood that threshing system 100 need not include vanes, as material flow adjustor 170 can be sufficient for controlling the flow of material without vanes.

Where rotatable crop flow adjustors such as augers are used, the rotational speed can be set at a faster rate to increase the flow of crop material, or rotated at a comparatively slower rate to decrease the flow of crop material. This ability to change crop flow by simply adjusting the speed of the crop flow adjustor makes crop flow control easier, and without the need to make any physical modification to the system, such as movement or reorientation of vanes inside the cage.

Crop flow adjustors in accordance with invention can include one auger for use in different applications. Alternatively, crop flow adjustors in accordance with the invention can include a kit or set of augers, each auger having a different thread arrangement, thread spacing and/or thread pitch. Each auger is configured to be interchangeable with the other augers, so that augers can be substituted for one another when changes in crop conditions or other variables require a change in auger configuration.

The manner in which augers are operated can be varied in accordance with the invention, depending on individual preferences, crop conditions, and/or how the threshing system is configured. For example, an operator of the combine might find that crop material is advancing too rapidly toward the second end or rear of the cage, creating a need to decrease the flow of material, at least temporarily. In such circumstances, augers in accordance with invention can be operated in a "reverse" direction (i.e. a direction opposite to the normal direction of rotation used to accelerate the flow of material toward the rear of the cage). In the reverse direction, the auger imparts an axially directed force on the crop mat toward the first end or front of the cage. This action can disrupt or slow down the rearward advancement of crop material in the cage, resulting in a net flow rate toward the rear of the cage that is within desired limits.

Augers in accordance with the invention are preferably operated by a variable drive to allow the rotational speed of the auger to be varied and infinitely adjustable. This provides the operator with an infinite number of options and settings for controlling the flow rate of material through the threshing system. Various means can be used to drive augers in accordance with the invention, including electric or hydraulic means.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A threshing system for an agricultural harvester, the threshing system comprising:
   a rotor comprising an elongated body, the elongated body having:
      a first end adapted to receive material from a feeding mechanism; and
      a second end opposite the first end;
   a substantially cylindrical cage that surrounds at least a portion of the rotor, the cage comprising an inner surface spaced radially apart from the rotor to define a threshing space between the rotor and the cage; and
   a material flow adjustor for controlling axial movement of material through the cage, the material flow adjustor being movably mounted adjacent to the threshing space and comprising at least one material conveying edge adapted to enter the threshing space, the material flow adjustor comprising an auger having a shaft, wherein the at least one material conveying edge is a thread that extends helically around the shaft,
   wherein the rotor is configured to rotate relative to the cage about a first axis of rotation to axially convey material from the first end of the rotor toward the second end of the rotor, and
   wherein the material flow adjustor is moveable between a first operative position, in which the at least one material conveying edge is spaced from the rotor in a radial direction by a first distance, and a second operative position, in which the at least one material conveying edge is spaced from the rotor in the radial direction by a second distance, the second distance being less than the first distance.

2. The threshing system of claim 1, wherein the material flow adjustor is configured to rotate about a second axis of rotation, the second axis of rotation extending parallel to and radially offset from the first axis of rotation of the rotor.

3. The threshing system of claim 1, wherein the material flow adjustor comprises an elongated body that extends generally parallel to the first axis of rotation, and wherein the at least one material conveying edge projects radially outwardly from the elongated body.

4. The threshing system of claim 3, wherein the at least one material conveying edge comprises a projection extending helically around the elongated body of the material flow adjustor.

5. The threshing system of claim 1, wherein the material flow adjustor is operable in a first mode to increase axial flow of material in the cage toward the second end of the rotor, and a second mode to decrease axial flow of material in the cage toward the second end of the rotor.

6. The threshing system of claim 5, wherein the material flow adjustor rotates in a first direction of rotation in the first mode, and rotates in a second direction of rotation in the second mode, the second direction of rotation being opposite the first direction of rotation.

7. The threshing system of claim 5, wherein the material flow adjustor rotates between about 0.1 rpm to about 35.0 rpm in the first mode.

8. The threshing system of claim 1, wherein the material flow adjustor is movably mounted to the cage.

9. The threshing system of claim 1, further comprising a housing attached to the cage and extending longitudinally along at least a portion of the cage, the material flow adjustor being movably mounted in an interior space of the housing, and advanceable from the interior space into the threshing space through an opening in the cage.

10. The threshing system of claim 9, wherein:
when the material flow adjustor is in the first operative position, the material flow adjustor is contained entirely within the interior space of the housing and outside of the threshing space, and
when the material flow adjustor is in the second operative position, at least a portion of the material flow adjustor extends into the threshing space.

11. The threshing system of claim 1, wherein the cage comprises a first wall section that defines the inner surface and directly borders the threshing space, and a second wall section that is offset radially outwardly relative to the first wall section to define an outer recess in the cage.

12. The threshing system of claim 11, wherein the material flow adjustor is movably mounted in the outer recess of the cage.

13. The threshing system of claim 12, wherein the material flow adjustor is movable in a circumferential direction relative to the cage between the first operative position and the second operative position.

14. The threshing system of claim 12, wherein the second wall section of the cage comprises a first end section and a second end section opposite the first end section, the first end section being spaced a third distance from the rotor, and the second end section being spaced a fourth distance from the rotor that is less than the third distance, such that the second wall section extends in an inward direction toward the rotor as the second wall section extends from the first end section toward the second end section.

15. The threshing system of claim 12, wherein the second wall section of the cage defines a guide surface in the outer recess that urges the material flow adjustor toward the rotor as the material flow adjustor is moved from the first operative position to the second operative position.

16. The threshing system of claim 1, further comprising an actuator for moving the material flow adjustor between the first operative position to the second operative position.

17. The threshing system of claim 16, wherein the actuator comprises an electric actuator, a hydraulic actuator or a manual lever.

18. The threshing system of claim 1, wherein the inner surface of the cage comprises one or more vanes for axially guiding material through the threshing space toward the second end of the rotor.

19. The threshing system of claim 1, wherein, when the material flow adjustor is moved to the first operative position, the at least one material conveying edge is positioned radially inwardly from the inner surface of the cage by a distance of about 0.1 mm to about 35.0 mm.

20. A threshing system for an agricultural harvester, the threshing system comprising:
a rotor comprising an elongated body, the elongated body having:
a first end adapted to receive material from a feeding mechanism; and
a second end opposite the first end;
a substantially cylindrical cage that surrounds at least a portion of the rotor, the cage comprising an inner surface spaced radially apart from the rotor to define a threshing space between the rotor and the cage;
a housing attached to the cage and extending longitudinally along at least a portion of the cage; and
a material flow adjustor for controlling axial movement of material through the cage, the material flow adjustor being movably mounted adjacent to the threshing space and in an interior space of the housing, the material flow adjustor being advanceable from the interior space into the threshing space through an opening in the cage, the material flow adjustor comprising at least one material conveying edge adapted to enter the threshing space,
wherein the rotor is configured to rotate relative to the cage about a first axis of rotation to axially convey material from the first end of the rotor toward the second end of the rotor,
wherein the material flow adjustor is moveable between a first operative position, in which the at least one material conveying edge is spaced from the rotor in a radial direction by a first distance, and a second operative position, in which the at least one material conveying edge is spaced from the rotor in the radial direction by a second distance, the second distance being less than the first distance,
wherein, when the material flow adjustor is in the first operative position, the material flow adjustor is contained entirely within the interior space of the housing and outside of the threshing space, and
wherein, when the material flow adjustor is in the second operative position, at least a portion of the material flow adjustor extends into the threshing space.

21. A threshing system for an agricultural harvester, the threshing system comprising:
a rotor comprising an elongated body, the elongated body having:
a first end adapted to receive material from a feeding mechanism; and
a second end opposite the first end;
a substantially cylindrical cage that surrounds at least a portion of the rotor, the cage comprising an inner surface spaced radially apart from the rotor to define a threshing space between the rotor and the cage, the cage further comprising a first wall section that defines the inner surface and directly borders the threshing space, and a second wall section that is offset radially outwardly relative to the first wall section to define an outer recess in the cage; and
a material flow adjustor for controlling axial movement of material through the cage, the material flow adjustor being movably mounted adjacent to the threshing space and comprising at least one material conveying edge adapted to enter the threshing space,
wherein the rotor is configured to rotate relative to the cage about a first axis of rotation to axially convey material from the first end of the rotor toward the second end of the rotor, and
wherein the material flow adjustor is moveable between a first operative position, in which the at least one material conveying edge is spaced from the rotor in a radial direction by a first distance, and a second operative position in which the at least one material conveying edge is spaced from the rotor in the radial direction by a second distance, the second distance being less than the first distance.

22. The threshing system of claim 21, wherein the material flow adjustor is movably mounted in the outer recess of the cage.

23. The threshing system of claim 22, wherein the material flow adjustor is movable in a circumferential direction relative to the cage between the first operative position and the second operative position.

24. The threshing system of claim 22, wherein the second wall section of the cage comprises a first end section and a second end section opposite the first end section, the first end section being spaced a third distance from the rotor, and the second end section being spaced a fourth distance from the rotor that is less than the third distance, such that the second wall section extends in an inward direction toward the rotor as the second wall section extends from the first end section toward the second end section.

25. The threshing system of claim 22, wherein the second wall section of the cage defines a guide surface in the outer recess that urges the material flow adjustor toward the rotor as the material flow adjustor is moved from the first operative position to the second operative position.

* * * * *